June 30, 1953     D. J. PICCONE     2,644,046
RECLOSING CIRCUIT INTERRUPTER
Filed June 23, 1950

Inventor:
Domenic J. Piccone,
by Ernest C. Britton
His Attorney.

Patented June 30, 1953

2,644,046

UNITED STATES PATENT OFFICE 2,644,046

RECLOSING CIRCUIT INTERRUPTER

Domenic J. Piccone, Ardmore, Pa., assignor to General Electric Company, a corporation of New York Application June 23, 1950, Serial No. 169,991

1 Claim. (Cl. 200—18)

This invention relates to automatic reclosing circuit interrupters and particularly to reclosers which are adapted for use on poly-phase circuits.

Application Serial No. 19,364 filed April 6, 1948, McCurry et al., assigned to the assignee of this application, discloses a single pole reclosing circuit interrupter of the type wherein closing operations are delayed and wherein predetermined opening operations are delayed during persistent fault conditions. The single pole recloser disclosed in this McCurry et al. application is arranged to lock its contacts in the open circuit position after a predetermined number of closely succeeding reclosing operations occurring during a persistent fault.

It is sometimes desirable to employ a single pole reclosing circuit interrupter of the type disclosed in the aforesaid application in series with each phase conductor of a polyphase circuit so that in case of a fault, such as a ground fault that involves only one phase conductor of the circuit, only the circuit interrupter in series with the faulted phase conductor is opened and reclosed. However, in the event that the fault is of a persistent character so that the single pole reclosing circuit interrupter in series with the faulted phase conductor is locked in its open circuit position, it is also desirable to effect the opening of the single pole circuit interrupters in the other phase conductors of the polyphase circuit so as to protect any polyphase apparatus that may be connected thereto.

One object of this invention is to provide an improved automatic reclosing mechanism for a plurality of single pole reclosing circuit interrupters whereby each of the circuit interrupters may be opened and reclosed a predetermined number of times while the other circuit interrupters remain in their closed circuit positions and whereby all of the closed circuit interrupters are automatically opened and maintained in their open circuit positions when any one of the circuit interrupters has been opened a sufficient number of times to cause it to be locked in its open circuit position.

Figure 1:
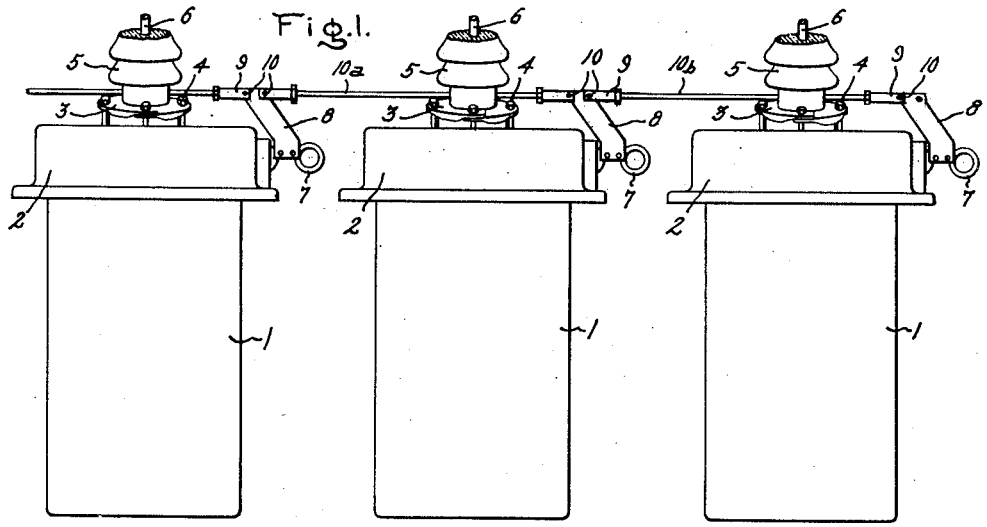
Figure 2:
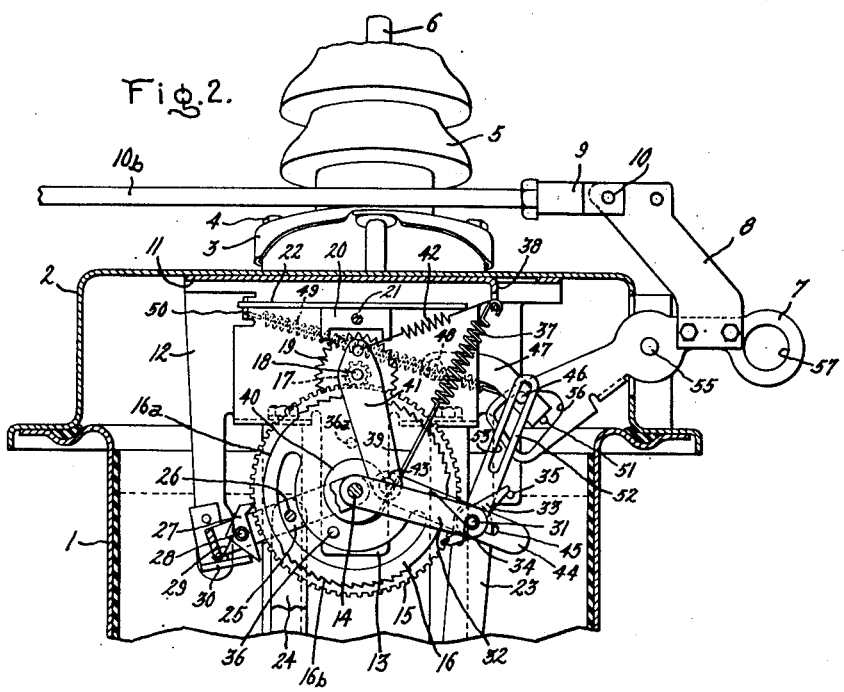

The invention will be better understood from the following description when taken in connection with the accompanying drawing in which Fig. 1 is a side elevation of a triple pole automatic reclosing circuit interrupter embodying my invention, and in which Fig. 2 is an enlarged sectional view of the upper portion of a single pole interrupter of the type shown in Fig. 1.

In Fig. 1, three single pole interrupters are shown connected for triple pole operation. Each of these interrupters comprises a tank 1 having a cover 2. An adapter plate 3 is secured to each of the covers 2 by means of bolts 4. A bushing member 5 is mounted on each adapter plate 3 and serves to insulate its associated conductor 6. It will be understood that each of the interrupting units of Fig. 1 is provided with two bushings such as 5, two adapter plates such as 3 and two conductors such as 6, the second terminal of each unit being disposed behind the terminals shown in Fig. 1 and hence hidden from view. Each of the interrupting units of Fig. 1 is provided with a manual operating handle 7 by which an operator can cause the contacts of the associated interrupter to be opened and closed.

In accordance with my invention all of the operating handles 7 are operably related with each other. A link 8 is secured to each operating handle or crank 7 by bolts or rivets or if desired could be formed integrally therewith. Clevis members 9 are pivotally secured at 10 to links 8. Clevis members 9 are interconnected by an operating rod which is made up of sections 10a and 10b which threadedly engage the clevis members 9. From the description thus far it will be obvious that operation of any one of the arms 7 will cause operation of the other manually operable arms or cranks 7.

In Fig. 2 only so much of the internal mechanism of the interrupting units utilized in my invention is shown as is deemed necessary for a complete understanding of the invention. A complete disclosure of the interrupter shown in Fig. 2 is contained in the above mentioned McCurry et al. application. In Fig. 2 a U-shaped supporting structure is secured to the inner surface of the cover 2. This U-shaped structure comprises the bight portion 11 and the prongs 12. Only one of these prongs 12 appears in Fig. 2 since this drawing is a cross-sectional view. The prongs 12 are provided with downwardly extending center portions 13 which support a shaft member 14 by a journal engagement therewith. Rotatable about the shaft 14 is a gear wheel 15 and a ratchet wheel 16 which if desired may be secured to each other by rivets or otherwise. Engageable with the gear wheel 15 is a pinion member 17 which is rotatable about a shaft 18 journally supported by prongs 12. Secured to and rotatable with the pinion 17 is a toothed wheel 19 arranged to engage an oscillatable member 20 pivoted at 21 to the prongs 12. Thus rotation of gear wheel 15 causes rotation of toothed wheel 19 and the velocity of rotation of these parts is controlled in known manner by the oscillatable member 20. The member 22 is secured to oscillatable member 20 for the purpose of increasing the inertia of that member.

As is more fully disclosed in the above mentioned McCurry et al. applicaton, the recloser of Fig. 2 is provided with a fixed main contact and a movable main contact. The rod 23 of Fig. 2 is interconnected with the movable main contact and is movable therewith. As is also disclosed in the above mentioned McCurry application an interrupter of the type shown in Fig. 2 is provided with a main coil which elevates rod 23 and the movable main contact, and a relay, the coil of which is in series with the main operating coil and the contacts of which are arranged in shunt with the main operating coil. Thus a fault or overload condition on the circuit associated with the interrupter will first energize the relay coil which in turn will elevate its armature and open its contacts thereby removing the shunt path from around the main operating coil. When this shunt path is removed, the main operating coil is then effective to open the main contacts. The rod 24 of Fig. 2 is interconnected with the relay armature.

Mounted for rotation about the shaft 14 is an arm 25 which is pivotally connected with the vertically operable arm 24 by means of a pin 26. An opening pawl 27 is mounted on pin 28 secured to arm 25. A spring 29 biases the opening pawl 27 in the clockwise direction about pin 28 against a stop member 30 mounted on one of the prongs 12. Thus when a fault or overload condition occurs the relay will elevate the operating arm 24 and will cause rotation of arm 25 in the clockwise direction about the shaft 14. When the opening pawl 27 moves out of engagement with the stop 30 spring 29 will bias the pawl into engagement with the ratchet wheel 16. If the pawl engages a smooth portion such as 16a of the ratchet wheel, there will be no time delay in the upward movement of rod 24 or of the relay armature or its contacts. If, however, the opening pawl 27 engages a toothed portion 16b of ratchet wheel 16 upward movement of rod 24 will be delayed due to the action of oscillatory member 20.

For the purpose of achieving time delayed closing of the main contacts, the rod 23 associated with the main contacts of the interrupter is operably related by pin 31 with an arm 32 which arm is rotatable about the shaft 14. A closing pawl 33 is mounted on the shaft pin 31 and is biased for rotation in the clockwise direction about shaft pin 31 by the spring 34 against a stop pin 35. Thus when operating rod 23 is moved upwardly to open the associated main contact, arm 32 is rotated in the counterclockwise direction about shaft 14. After closing pawl 33 moves out of engagement with stop 35 the pawl may then engage a toothed portion 16b of ratchet wheel 16, and as a result, closing downward movement of rod 23 will be delayed through the action of gear wheel 15, pinion 17, and oscillatory member 20. From the above description it will be observed that ratchet wheel 16 and gear wheel 15 are always rotated about shaft 14 in a clockwise direction due to closing downward movement of rod 23 and that these parts are rotated in a clockwise direction when operating member 24 moves upwardly if opening pawl 27 engages a toothed portion of the ratchet wheel. The interrupter disclosed in the above McCurry et al. application is arranged so that each closing operation and each opening operation after the first two openings are time delayed. Thus a predetermined number of closely succeeding circuit interrupting operations will cause a predetermined advancement in ratchet wheel 16 and gear wheel 15 in the clockwise direction. In this way a pin such as 36 which may be mounted on the ratchet wheel 16 will be advanced from its normal solid line position to an operated position as indicated by the dotted circle 36a. It will be understood, of course, that if the fault condition is not persistent in nature, the ratchet wheel and gear wheel will be returned to their normal positions by the operation of spring 37 which is affixed at its upper end to downwardly projecting portion 38 of the bight portion 11 of the U-shaped supporting member and which is connected at its lower end to a flexible wire 39 which in turn winds off of drum 40 secured to ratchet wheel 16.

For the purpose of causing the interrupter automatically to lock its contacts in the open circuit position, a lock-out linkage is disposed for engagement by the pin 36 after a predetermined movement thereof. To this end an arm 41 is mounted for rotation about the shaft 18. A spring 42 biases arm 41 for rotation about shaft 18 in a clockwise direction. Affixed to the lower end of the arm 41 by a pin 43 is another arm 44. Arm 44 is provided with a slot 45 in which the pin 31 rides. When arm 41 occupies the position shown, upward movement of rod 23 will cause counterclockwise rotation of arm 44 about pin 43 and the right hand end of arm 44 will clear the pin 46 mounted on toggle lever 47. When the pin 36 on ratchet wheel 16 engages the arm 41, that arm will be rotated in a counterclockwise direction about the shaft 18 against the bias of spring 42. This counterclockwise rotation of arm 41 will cause the arm 44 to shift bodily to the right. When so shifted to the right the right hand end of arm 44 is so far extended to the right that upward movement of rod 23 and the resulting counterclockwise rotation of arm 44 about pin 43 will cause the outer end of rod 44 to engage the pin 46 mounted on toggle lever 47 which toggle lever is rotatable about pin 48 supported by prongs 12. Suitable bias for toggle lever 47 is applied by means of spring 49 which is interconnected between pin 46 and projection 50 which may be integrally formed with prong 12. With the parts in the positions shown in Fig. 2 the center line of spring 49 is slightly below the center of pin 48 so that toggle lever 47 is in engagement with stop pin 51. After the righthand end of arm 44 engages the pin 46 toggle lever 47 is moved in the counterclockwise direction about its mounting pin 48. Since rod 23 is interconnected by means of the pin 31 with the link 52 having therein a slot 53 in which pin 46 rides, it will be obvious that counterclockwise rotation of toggle lever 47 under the action of spring 49 will elevate rod 23 and the parts associated therewith and will maintain the parts in the elevated position so long as the toggle pin 46 remains overcenter with respect to pin 48 and spring 49.

For the purpose of manually opening the interrupter, the manual operating arm or crank 7 is used. Arm or crank 7 is pivotally mounted to cover 2 by means of pin 55. Arm or crank 7 is provided with a large opening 56 through which pin 46 extends. Arm 7 is also provided with an aperture 57 for receiving a switch stick. Thus, if the switch stick is pulled downwardly, arm 7 is rotated in the clockwise direction about pin 55 and the pin 46 will eventually be moved upwardly upon engagement with a lower portion of opening 56. Thereafter toggle lever 47 will open the breaker and will maintain the breaker in the open position.

As has already been explained the arms 7 of all the units are interconnected by means of links 8, clevis members 9 and operating rod sections 10a and 10b. It will be observed that the pivots 10 are disposed slightly to the left of pivots 55 with the parts in their normal positions as shown in Fig. 2. Thus, when the breaker is closed, the operating rods 10a and 10b will tend to remain in the positions shown due to the pull of gravity until actuated toward the right by clockwise rotation of one of the arms 7 either due to manual operation or due to actuation by means of engagement between arm 44 and pin 46. During the movement to the right of rod portions 10a and 10b pivots 10 will move to the right of the vertical center line of pivots 55 and thereafter the weight of the rod and parts associated therewith will tend to aid the rotation of arm 7 in the clockwise direction about pins 55. It is in this way that the effective force exerted by spring 49 of each of the interrupters is augmented. Furthermore, after the rods 10a and 10b have been moved to the right as described, the parts will tend to remain in this position.

While I have in accordance with the patent statutes shown and described one embodiment of the invention, changes and modifications will be obvious to those skilled in the art and I, therefore, intend in the appended claims to cover all such changes and modifications as fall within the true spirit and scope of the invention.

What I claim as new and desire to secure by Letters Patent of the United States is:

In a circuit interrupter of the reclosing type comprising a plurality of single pole interrupting units each having its individual operating means, and normally inactive lockout means associated with each unit and effective upon actuation thereof for individually causing the corresponding unit to open; the improvement comprising: a manually-operable pivoted operating crank disposed on each unit and movable from a normal position to an operated position so as to actuate the associated normally inactive lockout means, an operating rod being operably related with said pivoted cranks, and means connecting said pivoted cranks to said operating rod at a location such that when said cranks are in said normal position, the weight of said operating rod and said connecting means biases said pivoted operating cranks in one direction to hold said cranks in said normal position and such that when said cranks are moved to their operated position the force due to the weight of said operating rod and said connecting means is shifted relative to the pivot of said cranks so that said force biases and acts to hold the cranks in said operated position.

DOMENIC J. PICCONE.

References Cited in the file of this patent

UNITED STATES PATENTS

| Number | Name | Date |
|---|---|---|
| 1,314,483 | Wood et al. | Aug. 26, 1919 |
| 1,769,563 | Wood | July 1, 1930 |
| 1,790,689 | Wood | Feb. 3, 1931 |
| 2,464,303 | Gesellschap | Mar. 15, 1949 |
| 2,476,076 | Walle et al. | July 12, 1949 |
| 2,567,411 | Van Ryan | Sept. 11, 1951 |